(12) United States Patent
Iizuka

(10) Patent No.: US 6,999,768 B2
(45) Date of Patent: Feb. 14, 2006

(54) MOBILE TELEPHONE COMMUNICATION SYSTEM CAPABLE OF CURTAILING REQUEST FOR HAND OFF TO A MOBILE TELEPHONE EXCHANGE

(75) Inventor: Hiromi Iizuka, Tokyo (JP)

(73) Assignee: NEC Corporation, Tokyo (JP)

( * ) Notice: Subject to any disclaimer, the term of this patent is extended or adjusted under 35 U.S.C. 154(b) by 433 days.

(21) Appl. No.: 10/156,200

(22) Filed: May 29, 2002

(65) Prior Publication Data
US 2002/0187785 A1 Dec. 12, 2002

(30) Foreign Application Priority Data
May 30, 2001 (JP) .............................. 2001-162618

(51) Int. Cl.
*H04Q 7/20* (2006.01)
(52) U.S. Cl. ...................... 455/442; 455/436; 455/403; 455/407; 455/408; 455/422.1; 455/456.2; 455/456.3; 370/331
(58) Field of Classification Search ................ 455/436, 455/403, 407, 408, 422.1, 442, 456.2, 456.3; 370/331
See application file for complete search history.

(56) References Cited

U.S. PATENT DOCUMENTS

| 6,044,272 | A | 3/2000 | Kobylinski et al. | |
| 6,195,552 | B1 * | 2/2001 | Jeong et al. | 455/436 |
| 6,424,833 | B1 | 7/2002 | Iizuka et al. | |
| 6,477,154 | B1 | 11/2002 | Cheong et al. | |
| 6,549,524 | B1 * | 4/2003 | Shin | 370/331 |

FOREIGN PATENT DOCUMENTS

| JP | 06-038268 | 2/1994 |
| JP | 09-135477 | 5/1997 |
| JP | 10-145834 | 5/1998 |
| JP | 10-145842 | 5/1998 |
| JP | 11-164348 | 6/1999 |
| JP | 11-215535 | 8/1999 |
| JP | 2000-013839 | 1/2000 |
| JP | 2000 013839 | 1/2000 |
| JP | 2000-083273 | 3/2000 |

OTHER PUBLICATIONS

Nijhof et al., "Base Station System Configurations for Future Universal Mobile Telecommunication Systems," *IEEE Transactions on Vehicular Technology,* vol. 43, No. 3, Aug. 1, 1994, pp. 659-664.

(Continued)

*Primary Examiner*—Joseph Feild
(74) *Attorney, Agent, or Firm*—Foley & Lardner LLP

(57) ABSTRACT

A mobile telephone communication system capable of curtailing request for hand off to a mobile telephone exchange is disclosed. The mobile telephone communication system of the present invention is constituted by a plurality of radio base station groups, and one mobile telephone exchange. The radio base station group is constituted by a plurality of subordinate radio base stations providing a speech service to a mobile telephone device, and one main radio base station controlling the plurality of subordinate radio base stations. In the case where the mobile telephone device moves within the radio base station group, the main radio base station switches the mobile telephone device between the plurality of subordinate radio base stations. In the case where the mobile telephone device moves from one radio base station group to a different radio base station group, a hand off indicating signal is transmitted from the mobile telephone exchange to the main radio base station so that the hand off is carried out between the radio base station groups.

3 Claims, 3 Drawing Sheets

OTHER PUBLICATIONS

Mouly et al., "The GSM System for Mobile Communications," Comprehensive Overview of the European Digital Cellular Systems, *The GSM Systems,* 1992, pp. 396-412.

ETSI TS 101 642, "Digital Cellular Telecommunications System (Phase 2+); Base Station System—Mobile-Services Switching Centre (BSS-MSC) Interface; Interface Principles," *Global System for Mobile Communications,* Jun. 2000, 9 Sheets.

ETSI TS 100 593, "Digital Cellular Telecommunications System (Phase 2+); Base Station Controller—Base Transceiver Station (BSC-BTS) Interface; Interface Principles," *Global System for Mobile Communications,* Jun. 2000, 10 Sheets.

EN 300 911, "Digital Cellular Telecommunications System (Phase 2+); Radio Subsystem Link Control," *Global System for Mobile Communications,* Aug. 1999, 30 Sheets.

Mouly et al., "The GSM System for Mobile Communications," Comprehensive Overview of the European Digital Cellular Systems, *The GSM Systems,* 1992, pp. 329-341-.

Makoto, "Mobile Telephone Communication System and Method for Measuring and Controlling Electric Field of Mobile Telephone Terminal," *Patent Abstracts of Japan,* vol. 2000, No. 04, Aug. 31, 2000, JP 2000-013839, Jan. 14, 2000, Abstract.

Nijhof, et al., "Base Station System Configurations For Future Universal Mobile Telecommunication Systems", IEEE Transactions on Vehicular Technology, vol. 43, No. 3, Aug. 1, 1994, pp. 659-664.

Mouly et al., "The GSM System for Mobile Communications", Comprehensive Overview of the European Digital Cellular Systems, The GSM Systems, 1992, pp. 329-341.

Mouly et al. "The GSM System for Mobile Communications", GSM System for Mobile Communications. Comprehensive Over of the European Digital Cellular Systems, 1992, pp. 362-366.

"Digital Cellular Telecommunications System (Phase 2+); Base Station System—Mobile-Services Switching Centra (BSS-MSC) Interface; Interface Principles", Jun. 2000, pp. 1-18.

"Digital Cellular Telecommunications System (Phase 2+); Base Station Controller—Base Transceiver Station (BSC-BTS) Interface; Interface Principles", Jun. 2000, pp. 1-19.

* cited by examiner

MOBILE TELEPHONE COMMUNICATION SYSTEM CAPABLE OF CURTAILING REQUEST FOR HAND OFF TO A MOBILE TELEPHONE EXCHANGE

BACKGROUND OF THE INVENTION

1. Field of the Invention

The present invention relates to a hand over system in a mobile telephone communication system.

2. Description of the Related Art

A method of switching radio base stations in compliance with the movement of a mobile telephone device, which has been carried out by the conventional mobile telephone communication system as disclosed in Japanese Laid-open patent Publication No. 2000-13839 (the Publication of Japanese Patent No. 3037271), will be described hereinbelow with reference to FIG. 1.

As shown in FIG. 1, the conventional mobile telephone communication system is constituted by mobile telephone exchange 11, radio base stations 12 through 18, and mobile telephone devices 19. This conventional mobile telephone communication system provides call service for a mobile telephone device moving in a plurality of areas for providing a speech service, namely, service areas 2000, 3000, 4000, 5000, 6000, 7000 and 8000. Service areas 2000, 3000, 4000, 5000, 6000, 7000 and 8000 are provided with radio base stations 12, 13, 14, 15, 16, 17, and 18, respectively. In FIG. 1, although only radio base stations 12, 13, 14, 15, 16, 17, and 18 are illustrated, non-illustrated number of radio base stations are practically provided for arranging service areas without any void among them, and different field-measuring channels are allocated for neighboring radio base stations. Each of radio base stations 12, 13, 14, 15, 16, 17, and 18 is connected to mobile telephone exchange 11 by set line 10, which contains a set of controlling signal lines and speaking lines. In this mobile telephone communication system, there is a plurality of mobile telephone devices 19 freely movable through the above-mentioned service area groups.

When mobile telephone device 19 receives an electrical field level measuring requesting signal from the radio base station where the device is located at that time, the device measures an electrical field level of the field-measuring channel contained in the received electrical field level measuring request signal and an electrical field level of a downlink speech channel allocated to the current call, and periodically transmits the measured data, as an electrical field level result signal, to the radio base station in question.

Now, mobile telephone device 19 is located in service area 2000, and carries out an await call from mobile telephone exchange 11 while being in synchronization with the downlink control channel of radio base station 12. At this time, when mobile telephone device 19 carries terminating motion or originating motion, a vacant speaking channel of radio base station 12 is allocated to the device via set line 10 connected to mobile telephone exchange 11, for providing a speech service.

When the speech service begins, radio base station 12 transmits, from the field-measuring channel lists of the neighboring radio base stations that are owned by radio base station 12, an electrical field level measuring request signal containing therein frequencies of the field-measuring channels of radio base stations 13 and 14 of service areas 3000 and 4000 neighboring to service area 2000 in which mobile telephone device 19 is located.

Mobile telephone device 19 then, during the continuation of the speech service, measures the electrical field levels of the field-measuring channels of neighboring radio base stations 13 and 14 on the basis of the received electrical field level measuring request signal, and periodically transmits this electrical field level measured value and an electrical field level measured value of the downlink speech channel, which is used for speaking with radio base station 12, to radio base station 12 as an electrical field level measuring result signal.

In radio base station 12, comparison is carried out between the electrical field level measured value of the downlink speech channel used for speaking and a predetermined electrical field level threshold value. The electrical field level threshold value is the minimum value of electrical field levels that mobile telephone devices located in respective service areas can receive from the associated radio base stations.

When the value of the electrical field level measuring result of the downlink speech channel in use for speaking becomes smaller than the electrical field level threshold value, radio base station 12 judges that mobile telephone device 19 is located in a boundary region of service area 2000, and transmits the electrical field level measured value of this downlink speech channel together with the electrical field level measured values of the field-measuring channels of neighboring service areas 3000 and 4000 to mobile telephone exchange 11 as an electrical field level degradation report signal. Then, mobile telephone exchange 11 selects a service area of which the electrical field level measured value of the field-measuring channel is the largest by referring to the hand off list that is owned by the exchange, on the basis of the received electrical field level degradation report signal, and performs a soft hand off control for transferring the speech service to the new service area.

In the described conventional mobile telephone communication system, when mobile telephone device 19 receiving a speech service moves from service area 2000 of radio base station 12 to service area of radio base station 13, the soft hand off control is performed by mobile telephone exchange 11 from radio base station 12 that is the source of the hand off, to radio base station 13 that is the destination of the hand off. Thus, mobile telephone device 19 can successively receive the speech service.

Today's outstanding propagation of the mobile telephone communication system brings about a variety of marketable needs. Therefore, there has occurred a necessity for providing speech service either in a dense population area or within a public building. To satisfy the necessity, the covering area of a radio base station, which is controlled by mobile telephone exchange 11 so as to provide a speech service to mobile telephone devices 19, has been narrowed.

When mobile telephone device 19 moves in a speech service area of mobile telephone exchange 11, it is necessary for mobile telephone exchange 11 to carry out switching of speech channels so as to follow the movement of mobile telephone device 19. More specifically, it is necessary that mobile telephone exchange 11 switches the speech channel used now by mobile telephone device 19 from radio base station 12, which at present provides mobile telephone device 19 with a speech service, to neighboring radio base station 13 or 14, which will provide the next successive speech service. Thus, radio base station 12 transmits an electrical field level measuring request signal to mobile telephone device 19 for urging the device to measure field-measuring channels of radio base stations 13 and 14 neighboring to the covering area of radio base station 12. Thus, radio base station 12 detects that the electrical field level measured value of the downlink speech channel within its own radio base station has degraded to become equal to or smaller than the electrical field level threshold value, from the electrical field level measuring result signal receiving from mobile telephone device 19. Then, radio base station 12 generates an electrical field level degradation report signal for reporting the signal to mobile telephone exchange 11, and as a result, drive the soft hand off therefrom to radio base station 13 or 14. However, when the covering area of each of the radio base stations is narrowed, a time period necessary for driving of the soft hand off is shortened. Accordingly, a series of soft hand off control will often be driven so as to increase the number of controlling signals of mobile telephone exchange 11 and as a result, there occurs such a problem that the performance of mobile telephone exchange 11 must be extensively lowered.

Further, the narrowing of the covering area by the radio base station brings about an increase in the number of radio base stations for narrow covering area compared with the number of radio base stations arranged in a conventional covering area. Thus, the number of connections of set line 10, which is a set of controlling signal lines and speaking lines used for interconnecting between mobile telephone exchange 11 and the radio base stations arranged in the control territory of the exchange, is proportionally increased whereby a large effect must be provided onto an equipment cost. That is to say, in the above-described conventional mobile telephone communication system, when a mobile telephone exchange accommodates a large number of radio base stations for narrow covering area in the controlling territory thereof, problems occur such that the rate of success for achieving the hand off control for mobile telephone devices must be lowered, and also the performance of the mobile telephone exchange during the hand off controlling operation must be extensively lowered. In addition, equipment cost charged for the introduction of the system will be increased.

SUMMARY OF THE INVENTION

It is an object of the present invention to provide a mobile telephone communication system capable of solving the above-described problems, able to increase the success rate of hand off for a mobile telephone device while enhancing the performance of a mobile telephone exchange while controlling the hand off even when many radio base stations for narrow covering area are accommodated in the control territory of the system, and further capable of reducing a charge for the cost for equipment upon introduction of the system.

In order to achieve the above object, a mobile telephone communication system according to the present invention comprises a plurality of mobile telephone devices able to move through a plurality of service areas, a plurality of radio base station groups, each being constituted by a plurality of subordinate radio base stations and a main radio base station, and a mobile telephone exchange.

The plurality of subordinate radio base stations are arranged in a plurality of service areas, respectively, to provide a speech service to mobile telephone devices. The main radio base station is connected to the plurality of subordinate radio base stations via a set line, and carries out a hand off control to permit the mobile telephone devices to move between the above-mentioned subordinate radio base stations accommodated in the control territory thereof in compliance with the movement of the mobile telephone devices. The mobile telephone exchange is connected to the main radio base stations via the set lines, and carries out a hand off control to permit the mobile telephone devices to move between the main radio base stations accommodated in the control territory thereof in compliance with the movement of the mobile telephone devices.

Further, according to an embodiment of the present invention, the main radio base station is constituted by an electrical field level measuring indicating means, an electrical field level comparing means, a softer hand off controlling means, an electrical field level degradation report means, and an electrical field level measuring result canceling means.

The electrical field level measuring indicating means confirms, when the above-mentioned mobile telephone device located in the service areas of the above-mentioned subordinate radio base stations under the control of the main radio base station begins a speech service by a termination or an origination, the subordinate radio base stations of the service areas neighboring to the service area in which the mobile telephone device is located, from a list of field measuring channels of the subordinate radio base stations that are owned by the main radio base station. In then transmits an indication for measurement of the electrical field levels of the field measuring channels and the downlink speech channels of the said confirmed subordinate radio base stations to the mobile telephone device as an electrical field level measuring request signal.

The electrical field level comparing means compares the measured electrical field level values of the downlink speech channels contained in the electrical field level measuring result signal having been received from the mobile telephone device, with a predetermined electrical field level threshold value.

The softer hand off controlling means compares, in cases where the electrical field level measured values of the downlink speech channels are smaller than the above-mentioned electrical field level threshold value, the electrical field level measured values of the field measuring channels of the subordinate radio base stations in the neighboring service areas, that are contained in the electrical field level measuring result signal, with the electrical field level threshold value, respectively. In then permits, in cases where an electrical field level measured values of a field measuring channel within its own radio base station group is equal to or larger than the above-mentioned electrical field level threshold value, softer hand off of the mobile telephone device to the subordinate radio base station of the said field measuring channel.

The electrical field level degradation report means transmits, by relay, in cases where all the electrical field level measured value of the field measuring channel within its own radio base station group and the electrical field level measured value of the said downlink speech channel are smaller than the electrical field level threshold value, an electrical field level degradation report signal to the mobile telephone exchange.

The electrical field level measuring result canceling means cancels, in cases where the measured value of the electrical field level of the downlink speech channel is higher than the electrical field level threshold value, the electrical field level measuring result signal.

Further, in accordance with another embodiment of the present invention, the mobile telephone exchange is constituted by a hand off list table, and a soft hand off controlling means.

The hand off list table owns a hand off list of respective radio base station groups under the control of the mobile telephone exchange. The soft hand off controlling means refers to the hand off list table upon receipt of an electrical field level degradation report from the main radio base station, and transmits a hand off indication signal to a mobile telephone device via the main radio base station that is the hand off source, in which the mobile telephone device is located, in order to conduct the hand off of the mobile telephone device to the main radio base stations of the radio base station groups neighboring to the radio base station group containing therein the main radio base station that has transmitted the said electrical field level degradation report.

Furthermore, in accordance with a further embodiment of the present invention, a mobile telephone device comprises an electrical field level measuring means, an electrical field level measuring result reporting means, and an electrical field level measuring stopping means.

The electrical field level measuring means conducts, upon receipt of an electrical field level measuring request signal from the main radio base station, which controls a radio base station group from which the mobile telephone device receives a speech service, via a subordinate radio base station, measurement of electrical field levels of the field measuring channels of the neighboring plural subordinate radio base stations and measurement of an electrical field level of the downlink speech channel allocated for the speech. The electrical field level measuring result reporting means periodically reports the electrical field level measured values measured by the electrical field level measuring means to the main radio base station via the subordinate radio base station as an electrical field level measuring result signal. The electrical field level measuring stopping means receives a soft hand off indicating signal from a soft hand off controlling means of the mobile telephone exchange, thereby stopping measurement of both the electrical field levels of the field measuring channels of the neighboring subordinate radio base stations indicated by the main radio base station that is the source of the hand off and the electrical field level of the downlink speech channel, and further stopping transmission of an electrical field level measuring result signal.

In accordance with the present invention, when a mobile telephone device moves in the radio base station group, the hand off control by the main radio base station is conducted, and a request for the hand off for the mobile telephone exchange is not conducted. Therefore, in comparison with the conventional mobile telephone communication system in which the mobile telephone exchange must conduct all of the hand off controls between radio base stations, it is possible to reduce a load of the processing applied to the mobile telephone exchange. It is also possible to extensively reduce the equipment cost due to the fact that only the main radio base station, which controls a plurality of subordinate radio base stations, must be connected by the set line to the mobile telephone exchange.

The above and other objects, features and advantages of the present invention will become apparent from the following description with reference to the accompanying drawings, which illustrate preferred embodiments of the present invention.

DETAILED DESCRIPTION OF THE PREFERRED EMBODIMENT

Figure 1:
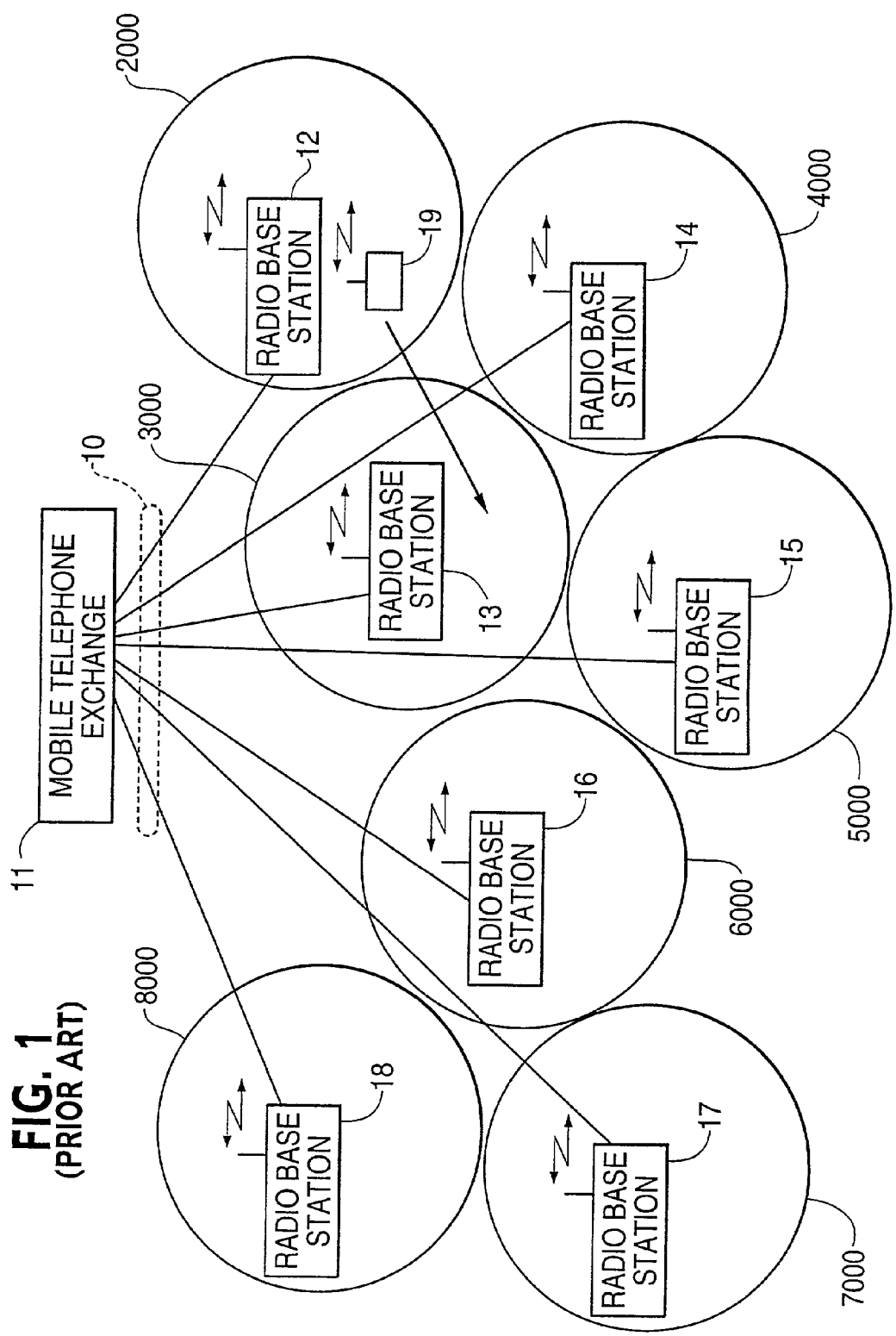
FIG. 1 is a system view illustrating the construction of a mobile telephone communication system according to the related art.
Figure 2:
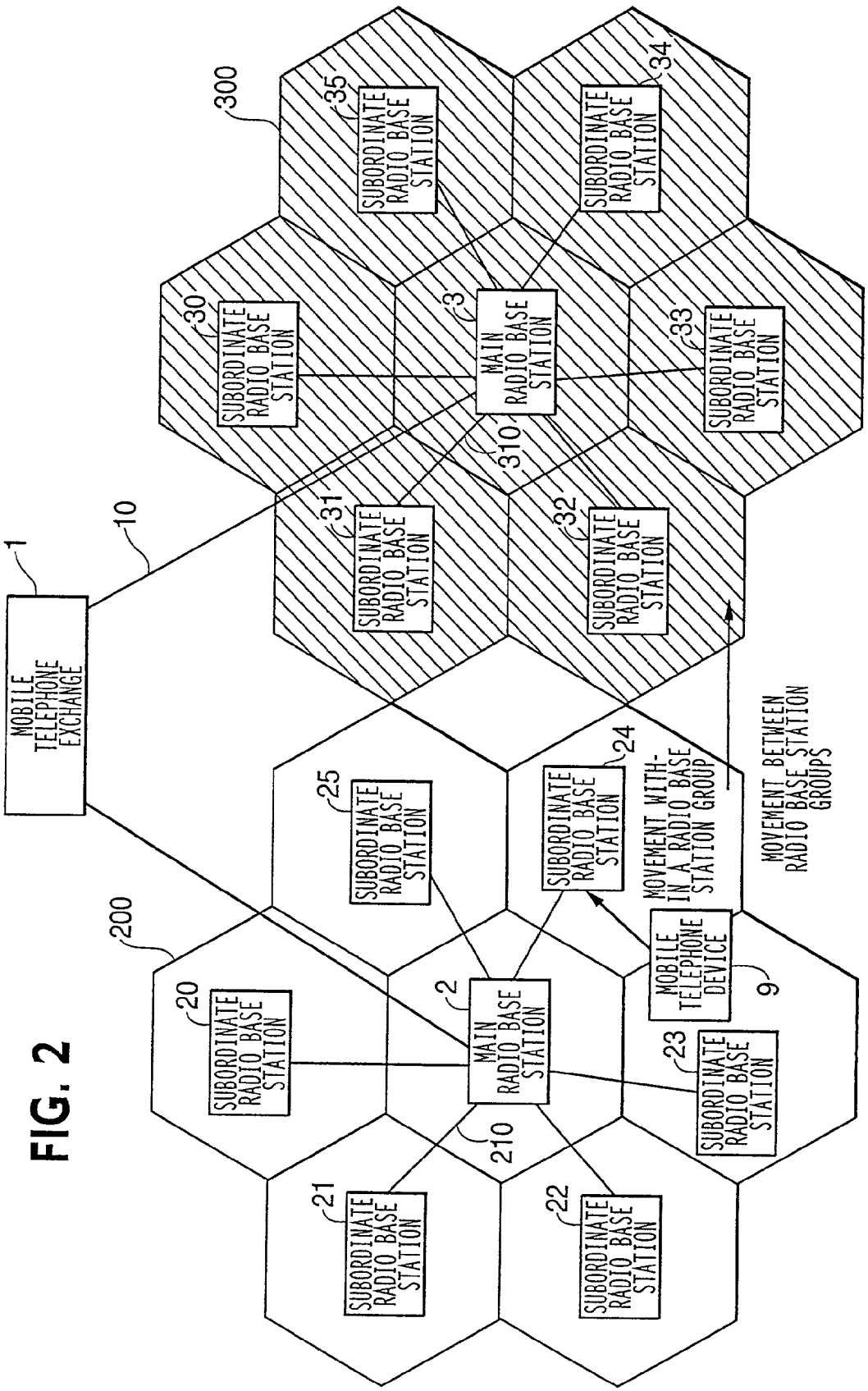
FIG. 2 is a system view illustrating the construction of a mobile telephone communication system according to an embodiment of the present invention.
Figure 3:
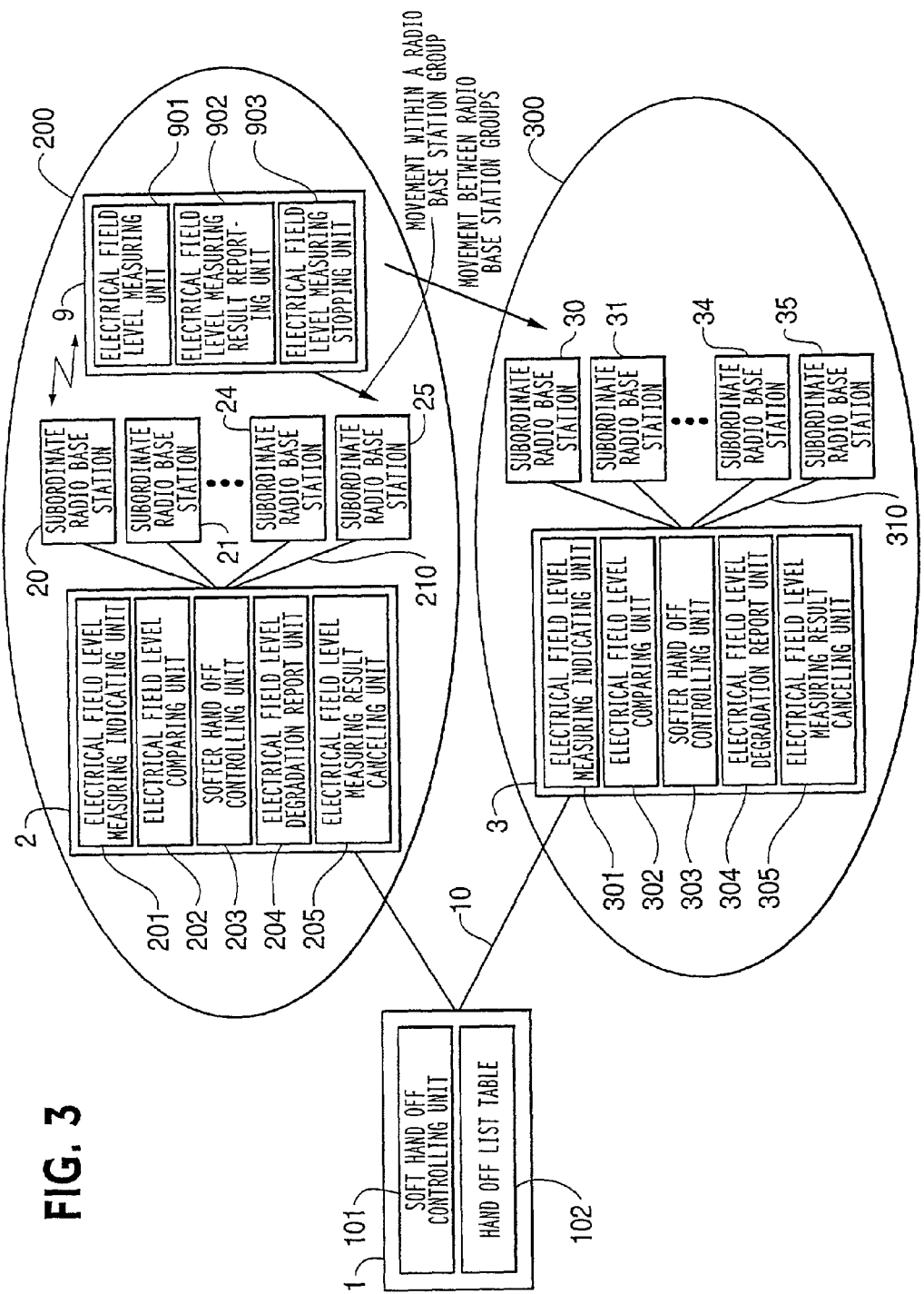
FIG. 3 is a block diagram illustrating the construction of radio base station groups 200 and 300 and mobile telephone exchange 1 of the mobile telephone communication system, according to an embodiment of the present invention.

In FIGS. 2 and 3, the mobile telephone communication system according to an embodiment of the present invention has mobile telephone device 9 movable through radio base stations 200 and 300, each being constituted by a plurality of narrow service areas, a plurality of subordinate radio base stations 20 through 25 and 30 through 35, main radio base stations 2 and 3, and mobile telephone exchange 1.

The plurality of subordinate radio base stations 20 through 25 and 30 through 35 are disposed in every narrow service area to provide a speech service to mobile telephone device 9. Main radio base stations 2 and 3 are connected to these subordinate radio base stations by set line 210 or 310, and conduct a hand off control for permitting mobile telephone device 9 to move between the subordinate radio base stations under control, in compliance with the movement of mobile telephone device 9.

Mobile telephone exchange 1 is connected to main radio base stations 2 and 3 by means of set line 10, and conducts the hand off control for permitting mobile telephone device 9 to move between main radio base stations 2 and 3 accommodated in the control territory of the exchange, in compliance with the movement of mobile telephone device 9.

Here, main radio base station 2 and subordinate radio base stations 20 through 25 constitute radio base station group 200, and main radio base station 3 and subordinate radio base stations 30 through 35 constitute radio base station group 300.

Although FIGS. 2 and 3 illustrate only radio base station groups 200 and 300, radio base stations, which constitute a large number of non-illustrated radio base station groups, are practically provided for by arranging narrow service areas without any void among them. Further, although single mobile telephone device 9 is illustrated in FIGS. 2 and 3, a plurality of mobile telephone devices other than device 9 are arranged so as to freely move and receive a speech service.

As illustrated in FIG. 3, main radio base station 2 is constituted by electrical field level measuring indicating unit 201, electrical field level comparing unit 202, softer hand off controlling unit 203, electrical field level degradation report unit 204 and electrical field level measuring result canceling unit 205.

When mobile telephone device 9 located in the narrow service area of subordinate radio base station 23 within radio base station group 200 controlled by main radio base station 2 starts a speech service by a termination or an origination, electrical field level measuring indicating unit 201 confirms subordinate radio base stations 22 and 24 of the narrow service areas neighboring to the narrow service area of subordinate radio base station 23 in which mobile telephone device 9 is located, from the list of the field level measuring channels of subordinate radio base stations 20 through 25, which is owned by main radio base station 2. It then transmits an indication for measuring the electrical field level of the field measuring channel of said subordinate radio base stations 22 and 24 to mobile telephone device 9 as an electrical field level measuring request signal.

Electrical field level comparing unit 202 compares the measured value of the electrical field level of a downlink speech channel contained in the electrical field level measuring result signal, which has been received from mobile telephone device 9, with a predetermined value of an electrical field level threshold.

In the case where the electrical field level measured value of the downlink speech channel contained in the electrical field level measuring result signal from mobile telephone device 9 is smaller than the above-mentioned electrical field level threshold value, softer hand off controlling unit 203 compares the electrical field level measured values of the field measuring channels of the subordinate radio base stations in the neighboring service areas that are contained in the electrical field level measuring result signal with the electrical field level threshold value, respectively. When the electrical field level measured value of the field measuring channel is equal to or larger than the electrical field level threshold value, softer hand off controlling unit 203 conducts a softer hand off of mobile telephone device 9 to the subordinate radio base station of that field measuring channel.

In the case where, in the electrical field level values of the field measuring channels of the neighboring subordinate radio base stations that are contained in the electrical field level measured values of the field measuring channels, all of the electrical field level values of the field measuring channels of the subordinate radio base stations within its own radio base station group are smaller than the electrical field level threshold value, electrical field level degradation reporting unit 204 transmits, by relay, an electrical field level degradation report, which is produced by editing the electrical field level measured values of the field measuring channels, to mobile telephone exchange 1.

Electrical field level measuring result canceling unit 205 cancels the afore-mentioned electrical field level measuring result signal when the electrical field level measured value of the downlink speech channel is higher than the electrical field level threshold value. Provision of electrical field level measuring result canceling unit 205 allows the report of the electrical field level measured values made to mobile telephone exchange 1 to be only the electrical field level degradation report, and accordingly the load of processing applied to main radio base station 2 and mobile telephone exchange 1 can be reduced.

As illustrated in FIG. 3, main radio base station 3 is constituted by electrical field level measuring indicating unit 301, electrical field level comparing unit 302, softer hand off controlling unit 303, electrical field level degradation reporting unit 304, and electrical field level measuring result canceling unit 305, and since the constitution is identical with that of main radio base station 2, an explanation thereof will be omitted here.

Mobile telephone exchange 1 has soft hand off controlling unit 101 and hand off list table 102.

Soft hand off controlling unit 101 receives an electrical field level degradation report from main radio base station 2, refers to hand off list table 102 owned by mobile telephone exchange 1, and transmits a hand off indication signal to mobile telephone device 9 via main radio base station 2, in order to carry out the hand off of mobile telephone device 9 to main radio base station 3 belonging to radio base station group 300, which neighbors to main radio base station 2 having transmitted the electrical field level degradation report.

Hand off list table 102 is provided for registering the number of the main radio base stations of every radio base station group.

Upon receipt of an electrical field level measuring request signal, mobile telephone device 9 measures an electrical field level of the field measuring channel contained in the electrical field level measuring request signal and the electrical field level of the downlink speech channel that is allocated to the speech at the present time, and periodically transmits the measured values to an associated main radio base station via the subordinate radio base station as an electrical field level result signal.

Mobile telephone device 9 has electrical field level measuring unit 901, electrical field level measuring result reporting unit 902, and electrical field level measuring stopping unit 903.

Electrical field level measuring unit 901 conducts an electrical field level measurement of the field measuring channels of neighboring subordinate radio base stations 22 and 24 as well as an electrical field level measurement of the downlink speech channel allocated to the speech, in compliance with an indication from electrical field level measuring indicating unit 201 of main radio base station 2, which controls subordinate radio base station 23 of the narrow service area in which mobile telephone device 9 is located.

Electrical field level measuring result reporting unit 902 edits the electrical field level measured values obtained by electrical field level measuring unit 901 to acquire an electrical field level measuring result signal, and periodically reports the acquired electrical field level measuring result signal to main radio base station 2 via subordinate radio base station 23.

Electrical field level measuring stopping unit 903, upon its receipt of a hand off indication signal from hand off controlling unit 101 of mobile telephone exchange 1 via main radio base station 2, stops the electrical field level measurement of the field measuring channels of neighboring subordinate radio base stations 22 and 24, and also stops transmission of the electrical field level measuring result signal.

A description of the operation for conducting the hand over processing in the mobile telephone communication system of the present embodiment will now be provided hereinbelow with reference to the drawings.

At first, an operation in the case of movement within a radio base station group, i.e., that in the case where mobile telephone device 9 moves only within radio base station group 200 will be provided.

Here, the description will be provided on the assumption that mobile telephone device 9 moved from the service area belonging to subordinate radio base station 23 to the service area belonging to subordinate radio base station 24.

When mobile telephone device 9 performs terminating or originating motion within the area of subordinate radio base station 23, a vacant speech channel is allocated to mobile telephone device 9 for permitting the device to begin speaking with main radio base station 2 via subordinate radio base station 23. In response to the beginning of a speech service, electrical field level measuring indicating unit 201 of main radio base station 2 transmits an electrical field level measuring request signal containing frequencies of the field measuring channels of subordinate radio base stations 22 and 24 of the service areas neighboring to the service area of subordinate radio base station 23, to mobile telephone device 9. Mobile telephone device 9 having received the electrical field level measuring request signal measures the electrical field level of the field measuring channel of subordinate radio base stations 22 and 24 and the electrical field level of the downlink speech channel of subordinate radio base station 23, and periodically transmits these electrical field level measured values, as an electrical field level measuring result signal, to electrical field level comparing unit 202 of main radio base station 2 via subordinate radio base station 23. Thus, in electrical field level comparing unit 202, the value of the electrical field level of the downlink speech channel contained in the electrical field level measuring result signal is compared with a predetermined electrical field level threshold value. When the electrical field level value of the downlink speech channel is equal to or larger than the predetermined electrical field level threshold value, electrical field level measuring result canceling unit 205 cancels the above-mentioned electrical field level measuring result signal. To the contrary, when the electrical field level value of the downlink speech channel is smaller than the predetermined electrical field level threshold value, softer hand off controlling unit 203 conducts comparison between the electrical field level measured values of the field measuring channels that are contained in the electrical field level measuring result signal and the electrical field level threshold value. At this stage, since mobile telephone device 9 has moved from the service area of subordinate radio base station 23 to the service area of subordinate radio base station 24, this movement causes a reduction in the electrical field level value of the downlink speech channel of subordinate radio base station 23, and causes an increase in the electrical field level measured value of subordinate radio base station 24. Then, as soon as the electrical field level measured value of the field measuring channel of subordinate radio base station 24 becomes equal to or larger than the electrical field level threshold value, softer hand off controlling unit 203 conducts softer hand off control for switching mobile telephone device 9 from the downlink speech channel of subordinate radio base station 23 to the downlink speech channel of subordinate radio base station 24.

Thus, the softer hand off control for mobile telephone device 9 from subordinate radio base station 23 to subordinate base station 24 is completed, so that the speech service to mobile telephone device 9 may be continued.

Now, a description of the operation in the case where mobile telephone device 9 moves between different radio base station groups, i.e., that in the case of the movement between radio base station groups will be provided below.

Here, a description will be provided on the assumption that mobile telephone device 9 has moved from the service area of subordinate radio base station 23 belonging to radio base station group 200 to the service area of subordinate radio base station 32 belonging to radio base station group 300.

In the above description of the movement within one radio base station group, for brevity's sake, it is assumed that the electrical field level measuring request signal transmitted from main radio base station 2 to mobile telephone device 9 indicates only measuring of the electrical field level of the downlink speech channel of subordinate radio base station 23 and of the electrical field level of the field measuring channels of subordinate radio base stations 22 and 24. However, since the service area of subordinate radio base station 23 is also very close to the service area of subordinate radio base station 32 belonging to radio base station group 300, the electrical field level measuring request signal transmitted from main radio base station 2 to mobile telephone device 9 practically indicates measuring of not only the electrical field level of the field measuring channels of subordinate radio base stations 22 and 24 but also the electrical field level of the field measuring channel of subordinate radio base station 32 belonging to radio base station group 300. Therefore, a description will be provided hereinbelow under a condition such that when mobile telephone device 9 stays in the area of subordinate radio base station 23, the electrical field level measuring request signal given from main radio base station 2 to mobile telephone device 9 contains frequencies of the field measuring channels of subordinate radio base stations 22, 24 and 32.

First, a series of operations including starting of speaking of mobile telephone device 9 with main radio base station 2 via subordinate radio base station 23, receiving of an electrical field level measuring request signal from electrical field level measuring indicating unit 201 of main radio base station 2 to thereby conduct measuring of the electrical field levels of the field measuring channels of subordinate radio base stations 22, 24 and 32 and the electrical field level of the down speech channel of subordinate radio base station 23, and periodically transmitting of these electrical field level measured values, as an electrical field level measuring result signal, to electrical field level comparing unit 202 of main radio base station 2 via subordinate radio base station 23 is identical with the afore-mentioned operations, and accordingly any repetitive explanation of the operation will be omitted here.

In electrical field level comparing unit 202, a comparison between the electrical field level value of the downlink speech channel contained in the electrical field level measuring result signal and the predetermined electrical field level threshold value is conducted. When the electrical field value of the downlink speech channel is equal to or larger than the predetermined electrical field level threshold value, electrical field level measuring result canceling unit 205 cancels this electrical field level measuring result signal.

On the other hand, when the electrical field level value of the downlink speech channel is smaller than the electrical field level threshold value, softer hand off controlling unit 203 conducts comparison between the electrical field level measured value of the field measuring channels contained in the electrical field level measuring result signal from mobile telephone device 9 and the electrical field level threshold value. At this stage, since mobile telephone device 9 has been moved from the service area of subordinate radio base station 23 to the service area of subordinate radio base station 32, the electrical field level measured value of every one of subordinate radio base stations 23 and 24 becomes smaller than the electrical field level threshold value, but the electrical field level measured value of the field measuring channel of subordinate radio station 32 becomes larger than the electrical field level threshold value. Thus, main radio base station 2 controlling subordinate radio base station 23 of the service area in which mobile telephone device 9 stays, judges that mobile telephone device 9 is not being moved within radio base station group 200 but has already been moved to neighboring radio base station group 300, and transmits to mobile telephone exchange 1, an electrical field level degradation report signal for requesting a soft hand off that is a hand off between radio base station groups.

Mobile telephone exchange 1 receiving the electrical field level degradation report signal from main radio base station 2 of radio base station group 200 that is the source of hand off, judges from the electrical field level measured result of neighboring radio base stations, which was measured by mobile telephone device 9, that subordinate radio base station 32 belonging to radio base station group 300 is the most optimum station as a hand off destination. Thus, mobile telephone exchange 1 transmits a hand off indication to main radio base station 3 to achieve the hand off control of mobile telephone device 9.

According to the mobile telephone communication system of the present embodiment, when mobile telephone device 9 moves within radio base station group 200, softer hand off control is conducted by softer hand off controlling unit 203 of main radio base station 2, and transmission of an electrical field level degradation report signal to mobile telephone exchange 1 does not occur. Therefore, in comparison with the conventional mobile telephone communication system in which a single mobile telephone exchange must conduct a hand off control between all of radio base stations, a load of processing applied to the mobile telephone exchange can be reduced.

Further, in the conventional mobile telephone communication system, although the mobile telephone exchange must have been connected one by one to every radio base station by respective set lines, in the present embodiment, the mobile telephone exchange may be connected, by means of set lines, to only main radio base stations, which control a plurality of subordinate radio base stations, respectively, and accordingly equipment cost can be extensively curtailed.

While a preferred embodiment of the present invention has been described using specific terms, such description is for illustrative purposes only, and it is to be understood that changes and variations may be made without departing from the spirit or scope of the following claims.

What is claimed is:

1. A mobile telephone communication system comprising:
a plurality of mobile telephone devices movable through a plurality of service areas;
a plurality of radio base station groups, each being constituted by a plurality of subordinate radio base stations disposed in every said plurality of service areas and providing said plurality of mobile telephone devices with a speech service, and a main radio base station connected to said plurality of subordinate radio base stations by means of set lines and conducting a hand off control for allowing said mobile telephone devices to move between said subordinate radio base stations, which are accommodated in a control territory thereof, in compliance with movements of said mobile telephone devices; and
a mobile telephone exchange connected to said main radio base stations by means of set lines, and conducting a hand off control for allowing said mobile telephone devices to move between said main radio base stations, which are accommodated in a control territory thereof, in compliance with movements of said mobile telephone devices,
wherein said mobile telephone device comprises:
an electrical field level measuring means for conducting, upon receipt of an electrical field level measuring request signal from said main radio base station, which controls the radio base station group from which said mobile telephone device receives a speech service via a subordinate radio base station, measurement of electrical field levels of the field measuring channels of neighboring plural said subordinate radio base stations as well as measurement of an electrical field level of the downlink speech channel allocated for speech;
an electrical field level measuring result reporting means for periodically reporting the electrical field level measured values measured by said electrical field level measuring means to said main radio base station via the subordinate radio base station as an electrical field level measuring result signal; and
an electrical field level measuring stopping means for receiving a soft hand off indicating signal from a soft hand off controlling means of said mobile telephone exchange, thereby stopping measurement of both the electrical field levels of the field measuring channels of said neighboring subordinate radio base stations indicated by said main radio base station that is the source of the hand off and the electrical field level of the downlink speech channel, and further stopping transmission of an electrical field level measuring result signal.

2. The mobile telephone communication system according to claim 1, wherein said main radio base station comprises:
an electrical field level measuring indicating means for confirming, upon beginning of a speech service by termination or origination of said mobile telephone device located in the service areas of said subordinate radio base stations under the control of said main radio base station, said subordinate radio base stations of the service areas neighboring to said service area in which said mobile telephone device is located, from a list of field measuring channels of said subordinate radio base stations that is owned by said main radio base station, and for transmitting an indication for measurement of electrical field levels of said field measuring channels and downlink speech channels of said subordinate radio base stations to said mobile telephone device as an electrical field level measuring request signal;
an electrical field level comparing means for comparing the measured electrical field level values of said downlink speech channels contained in an electrical field level measuring result signal having been received from said mobile telephone device, with a predetermined electrical field level threshold value;
a softer hand off controlling means for comparing, in cases where said electrical field level measured values of said downlink speech channels are smaller than said electrical field level threshold value, said electrical field level measured values of said field measuring channels of said subordinate radio base stations in said neighboring service areas, that are contained in said electrical field level measuring result signal, with said electrical field level threshold value, respectively, and for permitting, in case where an electrical field level measured value of a field measuring channel within its own radio base station group is equal to or larger than said electrical field level threshold value, softer hand off of said mobile telephone device to said subordinate radio base station of said field measuring channel;
an electrical field level degradation report means for transmitting, by relay, in case where all said measured value of the electrical field level of the field measuring channel within its own radio base station group and the electrical field level measured value of said downlink speech channel are smaller than said electrical field level threshold value, an electrical field level degradation report signal to said mobile telephone exchange; and
an electrical field level measuring result canceling means for canceling, in case where the electrical field level measured value of said downlink speech channel is higher than said electrical field level threshold value, said electrical field level measuring result signal.

3. The mobile telephone communication system according to claim 1, wherein said mobile telephone exchange comprises:
a hand off list table owning therein a hand off list of each of said radio base station groups under the control thereof; and
a soft hand off controlling means for referring to said hand off list table, upon receipt of an electrical field level degradation report from a main radio base station, and for transmitting a hand off indication signal to a mobile telephone device via said main radio base station that is the source of the hand off, in which said mobile telephone device is located, in order to conduct the hand off of said mobile telephone device to said main radio base stations of said radio base station groups neighboring to the radio base station group containing therein said main radio base station that has transmitted said electrical field level degradation report.

* * * * *